July 29, 1958 H. G. SCHUTZE 2,845,414
OLEFIN POLYMERIZATION PROCESS
Filed Nov. 5, 1956
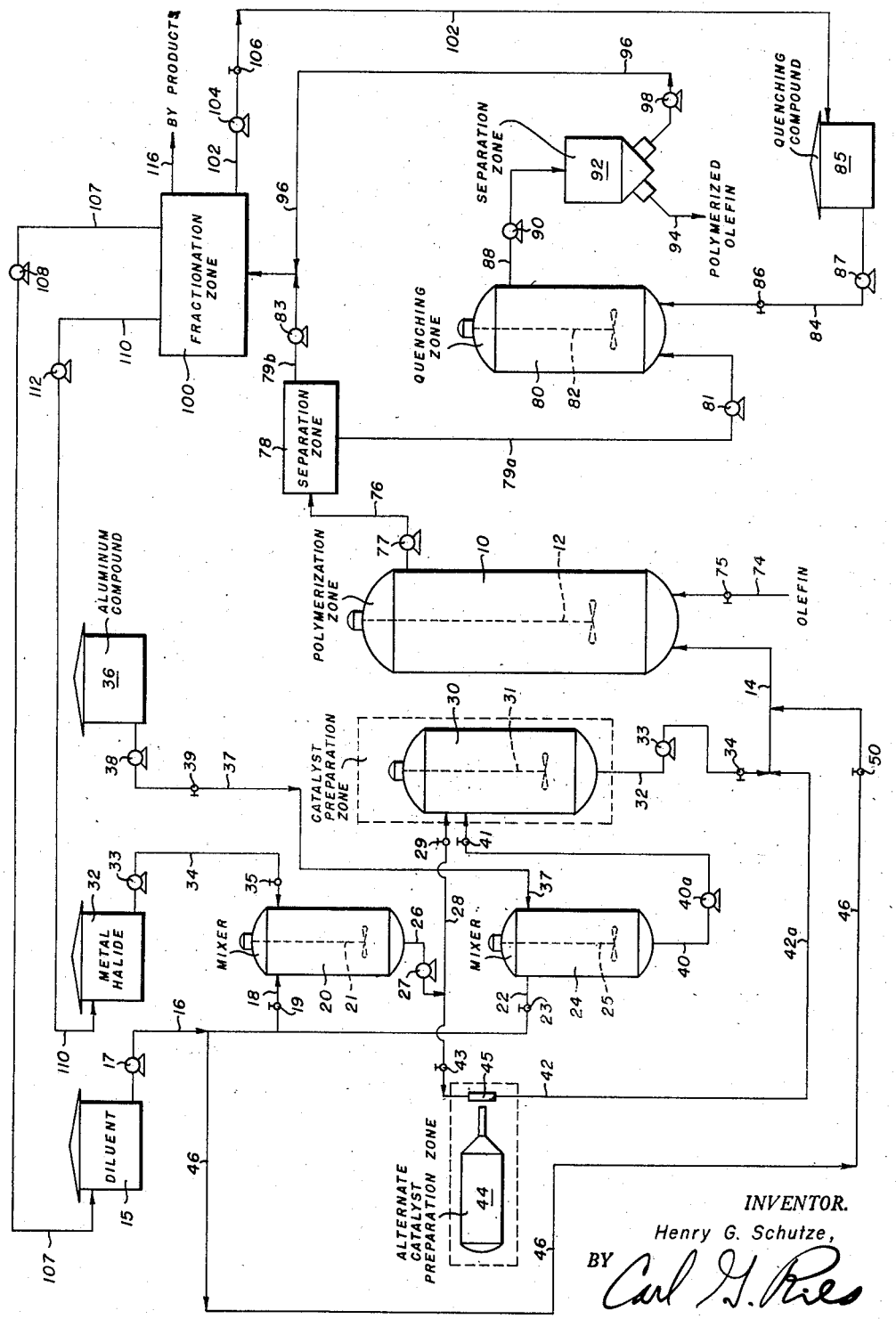
INVENTOR.
Henry G. Schutze,
BY *Carl G. Ries*
ATTORNEY.

United States Patent Office 2,845,414
Patented July 29, 1958

2,845,414

OLEFIN POLYMERIZATION PROCESS

Henry G. Schutze, Baytown, Tex., assignor, by mesne assignments, to Esso Research and Engineering Company, Elizabeth, N. J., a corporation of Delaware Application November 5, 1956, Serial No. 620,522

11 Claims. (Cl. 260—94.9)

This invention relates to a process for the polymerization of olefins. More particularly, this invention relates to a low temperature olefin polymerization process wherein olefin polymer products of substantially reduced ash content are obtained.

In polymerizing low molecular weight olefins in the presence of a non-polar organic diluent such as n-heptane and a catalyst composition prepared by reducing a halide of an amphoteric metal of groups IV–B, V–B, VI–B, and VIII of the periodic table in solution in the diluent, the olefin polymers that are prepared are normally characterized by an objectionably high ash content. Moreover, under normal conditions the amphoteric metal halide is not recovered for reuse in the process.

Accordingly, an object of the present invention is the provision of a process for the preparation of low ash content olefin polymers.

Another object is the provision of a process for the polymerization of low molecular weight olefins in the presence of a non-polar organic diluent containing a catalyst prepared by reducing a halide of an amphoteric metal of groups IV–B, V–B, VI–B, and VIII of the periodic table in solutions in the diluent, such process being conducted so as to recover olefin polymers of substantially reduced ash content and also so as to recover the metal halide utilized in preparing the catalyst.

A further object is the provision of an improved quenching step for use in an olefin polymerization process involving a non-polar organic diluent containing a catalyst prepared by reducing a halide of an amphoteric metal of groups IV–B, V–B, VI–B, and VIII of the periodic table dissolved in the diluent, such improved quenching step resulting in the provision of a substantially ash-free polymer product and further resulting in the recovery of at least a portion of the metal halide initially employed in preparing the catalyst composition.

These and other objects are attained, in general, by employing as a quenching medium in an olefin polymerization process, as hereinafter defined, a compound selected from the group consisting of methane tetrahalides, ethane hexahalides and $C_1$ to $C_4$ alkyl hypochlorites.

The polymers to be prepared in accordance with the present invention are polymers of low molecular weight olefins including $C_2$ to $C_6$ olefins such as ethylene, propylene, butene-1, pentene-1, and hexene-1, etc. Interpolymers of such olefins with each other and with other low molecular weight olefins such as piperylene, butadiene, etc. may also be prepared in accordance with the present invention. Thus, for example, polyethylene, polypropylene, ethylene-propylene copolymers, ethylene-butene-1 copolymers, ethylene-pentene-1 copolymers, ethylene-piperylene copolymers, ethylene-butadiene copolymers, propylene-butadiene copolymers, etc. may be prepared.

The polymerization catalyst to be used in accordance with the present invention is obtained by at least partially reducing in solution in a diluent a halide of an amphoteric metal selected from groups IV–B, V–B, VI–B, and VIII of the periodic system of elements (see, for example, the Henry D. Hubbard Periodic Chart of the Elements, 1947 ed., revised by W. F. Meegers; W. M. Welch Mfg. Co., Chicago, Ill.). Examples of suitable halides from which the catalysts of the present invention may be derived are the halides of titanium, zirconium, hafnium, thorium, uranium, vanadium, columbium, tantalum, chromium, molybdenum, tungsten, and mixtures thereof. Examples of suitable compounds include titanium tetrachloride, titanium tetrabromide, zirconium tetrachloride, and the like.

In preparing the catalysts to be used in accordance with the present invention the amphoteric metal halide is reduced in solution in a non-reactive non-polar organic diluent in any suitable manner such as by means of chemical reaction with a suitable chemical compound having reducing properties, by irradiation, etc. This is done to reduce at least a portion, and preferably more than about 30% of the amphoteric metal halide to a lower valence state. The product of the reduction step, comprising the diluent and the at least partially reduced amphoteric metal halide is employed as the medium in which olefin polymerization is effected.

The diluent to be employed should be a non-reactive, non-polar organic medium in which the amphoteric metal halide starting material is soluble to an extent at least sufficient to provide an 0.1 weight percent solution of amphoteric metal halide starting material. Thus, for example, in preparing the polymerization medium an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.), gas oil distillate fractions obtained from the catalytic cracking of virgin gas oil feed stocks, diesel oil, etc. It will be understood that, if desired mixtures of two or more compatible, miscible diluents may be employed. The diluent should be substantially completely free from oxygen, water and similar compounds of strong polarity which are reactive with the products obtained by reduction of the amphoteric metal halide.

In preparing the polymerization medium by radiation means, for example, the amphoteric metal halide, in solution in the diluent, may be at least partially reduced by exposure to radiation in the manner disclosed, for example, in copending Schutze et al. application Ser. No. 538,518 filed October 4, 1955, entitled "Catalysts and Process for Preparing and Using the Same." As is there disclosed, the radiation should be of an intensity sufficient to generate ion pairs in the metal halide. Various forms of ionizing radiation may be used including, for example, high energy electrons, beta rays, gamma rays, Bremsstrahlung, X-rays, alpha particles, tritons, deuterons, protons, neutrons, the various measons and hyperons and also recoil fragments of nuclear fission, fusion and spoilation reactions. In many instances it is desirable that the radiation have an intensity sufficient to provide an energy input of from about 0.5 to about 5,000 watt-hours of radiation per kilogram of solution during a period of about 0.1 to about 10 hours. It is frequently preferable to provide an energy input of from about 5 to 500 watt-hours of radiation per kilogram of solution. In this situation, the diluent should be a normal $C_5$ to $C_{10}$ paraffin and, preferably, should be n-heptane.

In accordance with another form of the present invention the amphoteric metal halide may be reduced in solution in the diluent by chemical means, such as by reaction with an aluminum compound having the formula:

$$AlR_2R'$$

wherein R may be an aryl group or a $C_1$ to $C_{18}$ alkyl group; and wherein R' may be R, hydrogen or halogen.

It will be understood that in this situation the diluent to be employed will be a diluent in which both the amphoteric metal halide and aluminum compound are soluble.

Preferred aluminum compounds which may be employed alone or in admixture are dialkyl aluminum monohalides and aluminum trialkyls containing from about 2 to 10 carbon atoms per alkyl group. Examples of suitable aluminum compounds include aluminum triethyl, aluminum trimethyl, aluminum tri-isopropyl, aluminum tri-isobutyl, aluminum diethyl bromide, aluminum diethyl chloride, aluminum diphenyl bromide, aluminum diphenyl chloride, aluminum triphenyl, didecyl aluminum chloride, dihexadecyl aluminum chloride, etc.

Particularly preferred aluminum compounds include aluminum triethyl, diethyl aluminum chloride, and mixtures thereof.

It should be noted that all equipment used for the storage, preparation, transfer, or utilization of the aluminum compound, the diluent and the amphoteric metal halide should be blanketed with a suitable inert gas such as nitrogen. In addition, the diluent, aluminum compound, and amphoteric metal halide should be free from oxygen, water, and other compounds of strong polarity which are reactive with the aluminum compound, the amphoteric metal halide, or the reduction product obtained therefrom because side reactions of this nature destroy the activity of the catalyst and further because the aluminum compounds are inflammable and combustible. Thus, for example, when necessary, the diluent may be purified prior to use by any suitable means such as, for example, by refluxing the diluent over metallic sodium or a similar agent and by subsequently distilling the thus refluxed diluent in an inert atmosphere such as nitrogen to remove objectionable compounds of substantial polarity.

When the metal halide is to be reduced by reaction with an aluminum compound, it is preferable to prepare separate solutions of metal halide and aluminum compound in the same or in mutually miscible diluents and thereafter to mix the two solutions with agitation, preferably for a catalyst activating holding time of from about 5 minutes to 1 hour employing a temperature of from about 70° to about 220° F. Still more preferably there is employed a holding time of about 15 to 45 minutes, a reaction temperature of about 100° to 175° F., or both.

In chemically reducing the amphoteric metal halide, the molar ratio of the aluminum compound to the amphoteric metal halide may vary widely. Preferably, the molar ratio of the aluminum compound to the metal halide should be in the range of about 0.3:1 to 12:1 and, preferably, in the range from about 3:1 to about 8:1.

When the amphoteric metal halide is to be at least partially reduced with an aluminum compound to form a polymerization medium, the amounts of aluminum compound and amphoteric metal halide to be employed should be such that there is provided a diluent containing from about 0.2 to 25 weight percent of added material (based on both the amphoteric metal halide and aluminum compound).

In order to form polymerized olefins in accordance with the present invention, a suitable olefin, such as ethylene, propylene, etc. or a mixture of two or more suitable olefins is brought into contact with a polymerization medium containing the at least partially reduced metal halide under polymerization reaction conditions. Generally speaking, the temperature may be in the range from about −60° to about 400° F. but, preferably, the temperature is room temperature. Higher temperatures can also be employed, if desired, but are generally undesirable in that catalyst decomposition is encountered. Subatmospheric pressures and pressures up to about 250 atmospheres may be employed with satisfactory results. It is generally preferable to employ a comparatively low pressure and, more specifically, to employ atmospheric pressure. Normally, a reaction time of about 60 minutes is required, although reaction times within the range of about 10 minutes to 24 hours may be employed.

As a result of this treatment, olefin polymers are formed, which polymers are essentially insoluble in the diluent whereby, on polymerization of the olefin there is obtained a slurry of polymerized olefin in the diluent-catalyst mixture.

A batchwise or continuous polymerization process may be used. In either case, it is desirable to provide a free-flowing slurry. It is therefore preferable that the slurry contain from about 5 to about 25 weight percent of polymer. In order to positively provide for a slurry containing this amount of polymer it is frequently desirable to add an additional quantity of diluent to the catalyst-containing polymerization medium, as originally prepared. The additional amount of diluent may be added prior to or during the course of the polymerization reaction. Thus, for example, it is frequently advantageous to employ from about 1 to 2 volumes of additional diluent per original volume of diluent for this purpose. The additional diluent may be the same as the original diluent or may be a different diluent, as defined above, which is compatible with and miscible with the original diluent.

In recovering the polymerized olefin from a slurry containing the same in accordance with the present invention, such slurry is first treated by suitable means such as centrifugation, filtration, distillation, etc. to substantially separate the polymer from the diluent and the polymer is then quenched with a compound selected from the group consisting of methane tetrahalides, ethane hexahalides and $C_1$ to $C_4$ alkyl hypochlorites.

Representative compounds of this nature include, for example, carbon tetrachloride, carbon tetrabromide, hexachloroethane, hexafluoroethane, tertiary butyl hypochlorite, etc. The quenching compound should be employed in an amount which is in excess of the stoichiometric amount of metal halide and aluminum compound (if any) initially employed in preparing the catalyst composition.

It is to be observed that suitable criteria to be considered in selecting the quenching compound of the present invention include the relative solubility (i. e., miscibility) of the quenching compound with the inert diluent for the polymerization reaction as well as the solubilizing properties of such quenching compound with respect to the polymerized olefin. Thus, the quenching compound to be employed in a given situation should be such that diluent remaining with the polymer after the diluent-polymer separation step will mix with the quenching component to form a homogeneous single phase liquid. It is also preferable that the quenching compound have at least a partial solubilizing action with respect to the polymerized olefin. A particularly preferred quenching compound in this respect is carbon tetrachloride which is solubilizing to at least a minor extent with respect to many of the polymerized olefins such as polyethylene whereby intimate contact between the quenching compound and the polymerized olefin is obtained and whereby the polymer surface will be preferentially wet by the quenching compound.

As a consequence of the quenching step, catalyst components insoluble in the diluent, including, for example, reduced metal halides derived from the metal halide starting material are solubilized by the quenching compound and, in addition, solubilization occurs with respect to catalyst components which might normally tend to remain adsorbed on, or otherwise intimately associated with, the polymerized olefin. Solubilization of the catalyst components may be enhanced through the addition of a catalytically effective amount (e. g. about 1% or less) of a free-radical generating compound (e. g. a peroxy compound such as tertiary butyl hydroperoxide, acetyl peroxide, cumene hydroperoxide, etc.). After solubilization of the catalyst components the polymerized olefin may be recovered from the diluent-quenching compound mixture with comparative ease to provide olefin polymers of substantially reduced ash content. Separation of the polymerized olefin from the diluent-quenching compound mixture may be accomplished by any suitable means such as filtration, centrifugation, gravity separation, etc.

Another significant feature of the present invention is that the reduced metal halides of the catalyst composition appear to be solubilized due to an oxidation type reaction with the quenching compound whereby the solubilized components of the catalyst composition are obtained in the form of the unreduced metal halide initially employed as a starting material for the preparation of the olefin polymerization catalyst. As a consequence, it is possible to recover the thus-regenerated amphoteric metal halide by any suitable means, such as by distillation, for subsequent use, if desired, in the preparation of olefin polymerization catalysts. Therefore, substantial economy may be obtained by the process of the present invention with respect to catalyst consumption.

The process of the present invention will be further described with respect to the accompanying drawing which is a schematic flow sheet illustrating one manner in which the polymerization process of the present invention may be conducted in a continuous fashion. It will be understood that the process of the present invention is conducted in the substantially complete absence of oxygen, water and similar deleterious compounds of strong polarity.

Turning now to the drawing, the numeral 10 designates a suitable polymerization zone provided with any suitable agitating means such as an agitator 12 mounted within the reactor. In accordance with the present invention a suitable polymerization medium (obtained in a manner to be described) comprising a diluent, such as n-heptane, having admixed therewith a polymerization catalyst prepared in accordance with the present invention, is charged to the polymerization zone 10 by way of a line 14.

The polymerization medium may be prepared by chemical reduction of an amphoteric metal halide with an aluminum compound in the presence of a diluent. When this is to be done, appropriate amounts of amphoteric metal halide and diluent are charged to a suitable first mixer 20 provided with agitating means such as an agitator 21. Thus, for example, diluent in a storage tank 15 may be discharged therefrom by a line 16 containing a pump 17 and from thence by a line 18 controlled by a valve 19 into the mixer 20. At the same time, an appropriate amount of amphoteric metal halide is discharged from an amphoteric metal halide storage tank 32 by way of a line 34 containing a pump 33 and controlled by a valve 35 into the mixer 20. An appropriate amount of diluent is also fed from the line 16 by way of a line 22 controlled by a valve 23 into a second mixer 24 containing suitable agitating means such as an agitator 25. An aluminum compound is also charged to the mixer 24 from an aluminum compound storage tank 36 by the way of a line 37 containing a pump 38 and controlled by a valve 39. In this manner, separate solutions of amphoteric metal halide in diluent and aluminum compound in diluent are prepared.

The solution of amphoteric metal halide in diluent is discharged from the first mixer 20 by way of a line 26 containing a pump 27 and from thence, by way of a branch line 28 controlled by a valve 29, to a catalyst preparation zone 30 provided with suitable agitating means such as an agitator 31. The diluent solution of aluminum compound is discharged from the second mixer 24 by way of a line 40 containing a pump 40a and controlled by a valve 41 and is also charged to the catalyst preparation zone 30.

Within the catalyst preparation zone 30 the amphoteric metal halide is at least partially reduced by reaction with the aluminum compound to form a polymerization medium suitable for use in the polymerization zone 10. The polymerization medium is discharged from the catalyst preparation zone 30 by way of a line 32 containing a pump 33 and controlled by a valve 34, the line 32 leading to the charge line 14 for the polymerization zone 10. If desired, an additional quantity of diluent may be admixed with the catalyst composition prior to the introduction of such composition into the polymerization zone 10. This may be accomplished, for example, by providing a supplemental diluent charge line 46 leading from the line 16 and controlled by a valve 50, such supplemental charge line leading to the polymerization zone charge line 14.

As another alternative, the amphoteric metal halide may be reduced by radiation means. For this purpose, there is shown an alternate catalyst preparation zone 44 containing suitable means for supplying radiation of the desired intensity such as, for example, an electron accelerator.

When this procedure is to be followed, it is not necessary to utilize an aluminum compound and, accordingly, the valve 39 in the aluminum compound charge line 37 leading to the mixer 24 may be closed, as well as the valve 23 in the diluent charge line 22. With respect to the amphoteric metal halide, the valve 29 in the branch line 28 may be closed and a valve 43 in alternate branch line 42 may be opened whereby the diluent solution of amphoteric metal halide will be delivered from the mixer 20 to the alternate catalyst preparation zone 44. In the alternate catalyst preparation zone 44 the solution of amphoteric metal halide and diluent is exposed to radiation in order to bring about at least a partial reduction of the amphoteric metal halide. As indicated, this may be accomplished in one manner by providing an electron accelerator for generating a beam of high energy electrons which may be directed to a zone 45 in the line 42 containing an electron transparent window (not shown), such as a window formed of aluminum, the electron beam being directed through the aluminum in order to bring about radiation of the amphoteric metal halide. The thus treated mixture is routed from the alternate catalyst preparation zone 44 by a line 42a to the charge line 14 leading to the polymerization zone 10.

A charge line 74 controlled by a valve 75 is provided for introducing an olefin to be polymerized into the polymerization zone 10. The monomeric olefin may be introduced in gaseous or liquid form. In the case of normally gaseous olefins such as ethylene, propylene, etc. it is not necessary to provide for liquefaction and, quite to the contrary, such olefins are preferably introduced into the polymerization zone 10 in their normally gaseous form.

It will be further understood that a mixture of olefins may be charged by way of the line 74 when interpolymers are desired and that, in addition, unreactive gaseous components such as methane, ethane, etc. may also be present. It will be further understood, of course, that compounds which have a deleterious effect such as oxygen, water, acetylene, etc. will be substantially completely excluded.

Polymerization of the olefin monomer occurs in the polymerization zone 10 whereby a slurry of polymerized olefin in the catalyst-containing diluent (i. e. polymerization medium) is formed. At least a portion of the slurry is discharged from the polymerization zone 10 by way of a line 76 containing a pump 77, the line 76 leading to a separation zone 78, wherein at least a major portion of the diluent is removed from the polymerized olefin by any suitable means, such as, for example, by centrifugation. The polymer-containing fraction is discharged from the separation zone 78 by way of a line 79a containing a pump 81 leading to a quenching zone 80 and containing suitable mixing means such as an agitator 82. The diluent fraction is discharged from separation zone 78 by way of a line 79b containing a pump 83 leading to a fractionation zone 100.

A stoichiometric excess of a quenching compound of the present invention (e. g. carbon tetrachloride), derived from a suitable source such as storage tank 85, is added to the quenching zone 80 by way of the line 84 controlled by a valve 86 and containing a pump 87. As a result, quenching of the polymer fraction occurs and catalyst components and diluent of the polymer fraction are solubilized so that a slurry of polymerized olefin in a single phase homogeneous liquid is formed. This slurry is discharged from the quenching zone 80 by way of a line 88 containing a pump 90 leading to a suitable separation zone 92 comprising suitable separating means such as a basket type centrifuge. Within the separation zone 92 the polymerized olefin is separated from the liquid components of the slurry and is discharged therefrom by way of a conduit 94 leading to conventional finishing zones such as drying, pelleting, extruding, bagging, etc. zones.

The liquid components of the slurry are discharged from the separating zone 92 by way of a line 96 containing a pump 98 leading to a suitable fractionation zone 100.

The fractionation zone 100 is diagrammatically indicated by means of a block in the drawing. It will be understood that in actual practice the fractionation zone will comprise suitable separating means such as one or more distillation towers, wherein the components of the liquid may be separated. Thus, for example, excess quenching compound not consumed during the quenching step may be recovered in the fractionation zone 100 and discharged therefrom by way of the line 102 containing a pump 104 and controlled by a valve 106, whereby the unreacted quenching compound may be returned to the quench compound storage tank 85.

As another example, purified diluent may be obtained in the fractionation zone 100 and discharged therefrom by way of a line 107 containing a pump 108, the line 107 leading to the diluent storage tank 15. In similar fashion the regenerated amphoteric metal halide may be obtained in the fractionation zone 100 and discharged therefrom by way of a line 110 containing a pump 112, the line 110 leading to the amphoteric metal halide storage tank 32. Reaction by-products which are not to be recovered or otherwise recycled for use in the polymerization process may be discharged from the fractionation zone 100 by way of a line 116.

What is claimed is:

1. In an olefin polymerization process wherein an olefin is polymerized in a non-polar organic diluent containing a polymerization catalyst prepared by at least partial reduction of a halide of an amphoteric metal selected from the class consisting of amphoteric metals of groups IV-B, V-B, VI-B, and VIII of the periodic table, the improvement which comprises intimately contacting the olefin polymer prior to recovery of the same with a compound selected from the group consisting of methane tetrahalides, ethane hexahalides and $C_1$ to $C_4$ alkyl hypochlorites to thereby substantially de-ash said olefin polymer and to thereby regenerate at least a portion of said halide.

2. In an olefin polymerization process wherein a $C_2$ to $C_6$ olefin is polymerized in a polymerization medium comprising a non-polar organic diluent containing a polymerization catalyst prepared by at least partially reducing a halide of an amphoteric metal selected from the class consisting of amphoteric metals of groups IV-B, V-B, VI-B, and VIII of the periodic table, the improvement which comprises intimately contacting the olefin polymer formed by said polymerization process with a compound selected from the group consisting of methane tetrahalides, ethane hexahalides and $C_1$ to $C_4$ alkyl hypochlorites to thereby subsantially de-ash said olefin polymer and to thereby regenerate at least a portion of said halide and thereafter separating polymerized olefin of reduced ash content from said quenching compound.

3. A process as in claim 2 wherein the olefin polymer is intimately contacted in the presence of a catalytically effective amount of a free radical-generating organic peroxide compound.

4. A process as in claim 2 wherein the said quenching compound is carbon tetrachloride.

5. A process as in claim 2 wherein said quenching compound is a $C_1$ to $C_4$ alkyl hypochlorite.

6. In a process for polymerizing a $C_2$ to $C_6$ alpha olefin which comprises the steps of (1) preparing a polymerization medium by dissolving a halide of an amphoteric metal selected from the class consisting of amphoteric metals of groups IV-B, V-B, VI-B, and VIII of the periodic table in a non-polar organic diluent and at least partially reducing said halide in said diluent, (2) adding an olefin to be polymerized to said polymerization medium under polymerization conditions to form a slurry of polymerized olefin in said polymerization medium, (3) separating said polymerized olefin from at least a major proportion of said diluent, the improvement which comprises intimately contacting at least a portion of said slurry with a compound selected from the group consisting of methane tetrahalides, ethane hexahalides and $C_1$ to $C_4$ alkyl hypochlorites to thereby substantially de-ash said olefin polymer and to thereby regenerate at least a portion of said halide, and recovering polymerized olefin of low ash content from said quenched polymerization medium.

7. In a process for polymerizing a $C_2$ to $C_6$ alpha olefin which comprises the steps of (1) continuously preparing a polymerization medium by dissolving a halide of an amphoteric metal selected from the class consisting of amphoteric metals of groups IV-B, V-B, VI-B, and VIII of the periodic table in a non-polar organic diluent and at least partially reducing said halide in said diluent, (2) continously adding an olefin to be polymerized to said polymerization medium under polymerization conditions to form a slurry of polymerized olefin in said polymerization medium, (3) continuously separating at least a portion of said polymerized olefin from at least a portion of said slurry, the improvement which comprises continuously intimately contacting said separated polymerized olefin with a compound selected from the group consisting of methane tetrahalides, ethane hexahalides and $C_1$ to $C_4$ alkyl hypochlorites to thereby substantially de-ash said olefin polymer and to thereby regenerate at least a portion of said halide, continuously separating polymerized olefin of low ash content from said quenching compound, continuously separating amphoteric metal halide from said quenching compound and employing said thus recovered amphoteric metal halide as at least a portion of the amphoteric metal halide utilized in continuously preparing said polymerization medium.

8. A process as in claim 7 wherein said separated polymerized olefin is intimately contacted with said compound in the presence of a catalytically effective amount of a free-radical generating organic peroxide compound.

9. In an olefin polymerization process wherein an olefin is polymerized in a non-polar organic diluent containing a polymerization catalyst prepared by at least partial reduction of a halide of an amphoteric metal selected from the class consisting of amphoteric metals of groups IV-B, V–B, VI–B, and VIII of the periodic table, the improvement which comprises intimately contacting the olefin polymer prior to recovery of the same with a compound selected from the group consisting of methane tetrahalides, ethane hexahalides, and $C_1$ to $C_4$ alkyl hypochlorites to thereby substantially de-ash said olefin polymer and to thereby regenerate at least a portion of said halide, and thereafter recovering said olefin polymer and said regenerated halide.

10. A process as in claim 9 wherein the olefin polymer is intimately contacted with said compound in the presence of a catalytically effective amount of a free radical generating organic peroxide compound.

11. A process as in claim 10 wherein the said compound is carbon tetrachloride.

References Cited in the file of this patent

UNITED STATES PATENTS 2,440,498  Young _____ Apr. 27, 1948

FOREIGN PATENTS 533,362  Belgium _____ May 16, 1955

OTHER REFERENCES

Schoepfle et al.: Ind. and Eng. Chem., vol. 23 (1931), pp. 1396–8.